(12) United States Patent
Nixon

(10) Patent No.: US 6,201,897 B1
(45) Date of Patent: Mar. 13, 2001

(54) TRANSFORMATION AND SELECTIVE INVERSE TRANSFORMATION OF LARGE DIGITAL IMAGES

(75) Inventor: Stuart William Nixon, San Diego, CA (US)

(73) Assignee: Earth Resource Mapping, San Diego, CA (US)

(*) Notice: Subject to any disclaimer, the term of this patent is extended or adjusted under 35 U.S.C. 154(b) by 0 days.

(21) Appl. No.: 09/188,833

(22) Filed: Nov. 9, 1998

(51) Int. Cl.$^7$ .............................. G06K 9/36; G06K 9/46
(52) U.S. Cl. .................................. 382/248; 382/240
(58) Field of Search .......................... 382/232, 240, 382/248, 263, 264

(56) References Cited

U.S. PATENT DOCUMENTS

| | | |
|---|---|---|
| 4,103,331 | 7/1978 | Thacker . |
| 4,751,507 | 6/1988 | Hama et al. . |
| 5,177,796 | 1/1993 | Feig et al. . |
| 5,297,219 | 3/1994 | Weldy . |
| 5,315,670 | 5/1994 | Shapiro . |
| 5,321,776 | 6/1994 | Shapiro . |
| 5,347,600 | 9/1994 | Barnsley et al. . |
| 5,381,145 * | 1/1995 | Allen et al. .................... 358/426 |
| 5,414,780 | 5/1995 | Carnahan . |
| 5,414,811 | 5/1995 | Parulski et al. . |
| 5,432,871 | 7/1995 | Novik . |
| 5,467,441 | 11/1995 | Stone et al. . |
| 5,477,469 | 12/1995 | Motomura . |
| 5,479,603 | 12/1995 | Stone et al. . |
| 5,546,477 | 8/1996 | Knowles et al. . |
| 5,561,464 | 10/1996 | Park . |
| 5,710,835 | 1/1998 | Bradley ............................ 382/233 |

FOREIGN PATENT DOCUMENTS

| | | |
|---|---|---|
| 0457546 A2 | 11/1991 | (EP) . |
| 0547546 A3 | 11/1991 | (EP) . |
| 2 325 584 | 11/1998 | (GB) . |
| WO 97/18527 | 5/1997 | (WO) . |

OTHER PUBLICATIONS

Cosman et al, "Image Compression For Memory Constrained Printers" Proc. 1998, Int. Conf. Image Processing, Chicago, Ill., Oct. 1998, pp. 109–113.

(List continued on next page.)

Primary Examiner—Phuoc Tran
(74) Attorney, Agent, or Firm—Gray Cary Ware Freidenrich

(57) ABSTRACT

Image transformation and selective inverse transformation is implemented by performing DWT-based transformation on very large images using single or multi-CPU architectures without requiring large amounts of computer memory. The compression of a large image I(x,y) is accomplished by defining L=(log2(x)−log2(Filter_size)) DWT levels, each level $L_n$ containing pre-allocated memory buffers sufficient to hold (Filter_size+1) lines of x/2n pixels length of DWT subbands. For each line of I(x,y), in a recursive fashion through levels $L_0$ to $L_n$, the level DWT is computed and the level subband wavelets are compressed and stored or transmitted as required. The recursive DWT for each level of each line of I(x,y) results in a seamless DWT for I(x,y). The continual transmission or storage of compressed imagery occurs where it is desirable to transmit high volumes of imagery through limited transmission bandwidth or to limited disk storage, and is accomplished by compression and transmission or storage of each subband wavelet transformed image line using wavelet quantization and encoding before transmission or storage. The selective decompression of imagery is accomplished by a recursive reverse DWT reconstruction on the desired subset of each image line from the desired subset of lines from a compressed image stored on disk or received from continual transmission, for only as many levels as required to result in the required level of detail view for the image subset to be accessed or viewed.

47 Claims, 7 Drawing Sheets

OTHER PUBLICATIONS

Vishwanath, "The Recursive Pyramid Algorithm For The Discrete Wavelet Transform", IEEE Transactions On Signal Processing, vol. 42, No. 3, Mar. 1994.

Chrysafis et al, "Compression", Data Compression Conference, Mar. 30–Apr 1, 1998, Snowbird, Utah.

Shapiro, "Embedded Image Coding Using Zerotrees Of Wavelet Coefficients", IEEE Transactions On Signal Processing, vol. 41, No. 12, Dec. 1993.

Reusens et al, "New Techniques For Subband/Wavelet Transform Coefficient Coding Applied To Still Image Comparession", SPIE vol. 1771, Applications of Digital Image Processing XV (1992).

Search Report for PCT/US99/10276.

Chrysafis Et al, "Line Based, Reduced Memory, Wavelet Image Compression", Proceedings DDC '98 Data Compression Conference (CAT. No. 98TB100225), Snowbird, UT USA, Mar. 30–Apr. 1 1998, pp. 398–407.

Patent Abstracts of Japan, Publication No. 10283342, Publication date Oct. 23, 1998, Inventor Ozaki Yasuharu.

Efimov et al, "Efficiency Of Some Algorithms For Lossless Data Compression In Two–Dimensional Data Arrays", Avtometriya, 1997, Allerton Press, Russia, No. 6, pp. 87–96.

Anonymous, "Sub–Band Coding Hardware Assist", IBM Technical Technical Disclosure Bullitin, vol. 34, No. 7B, Dec. 1991, US.

Cosman et al, "Memory Constrained Wavelet Based Image Coding", IEEE Signal Processing Letters, Vo. 5 No. 9, Sep. 1998.

* cited by examiner

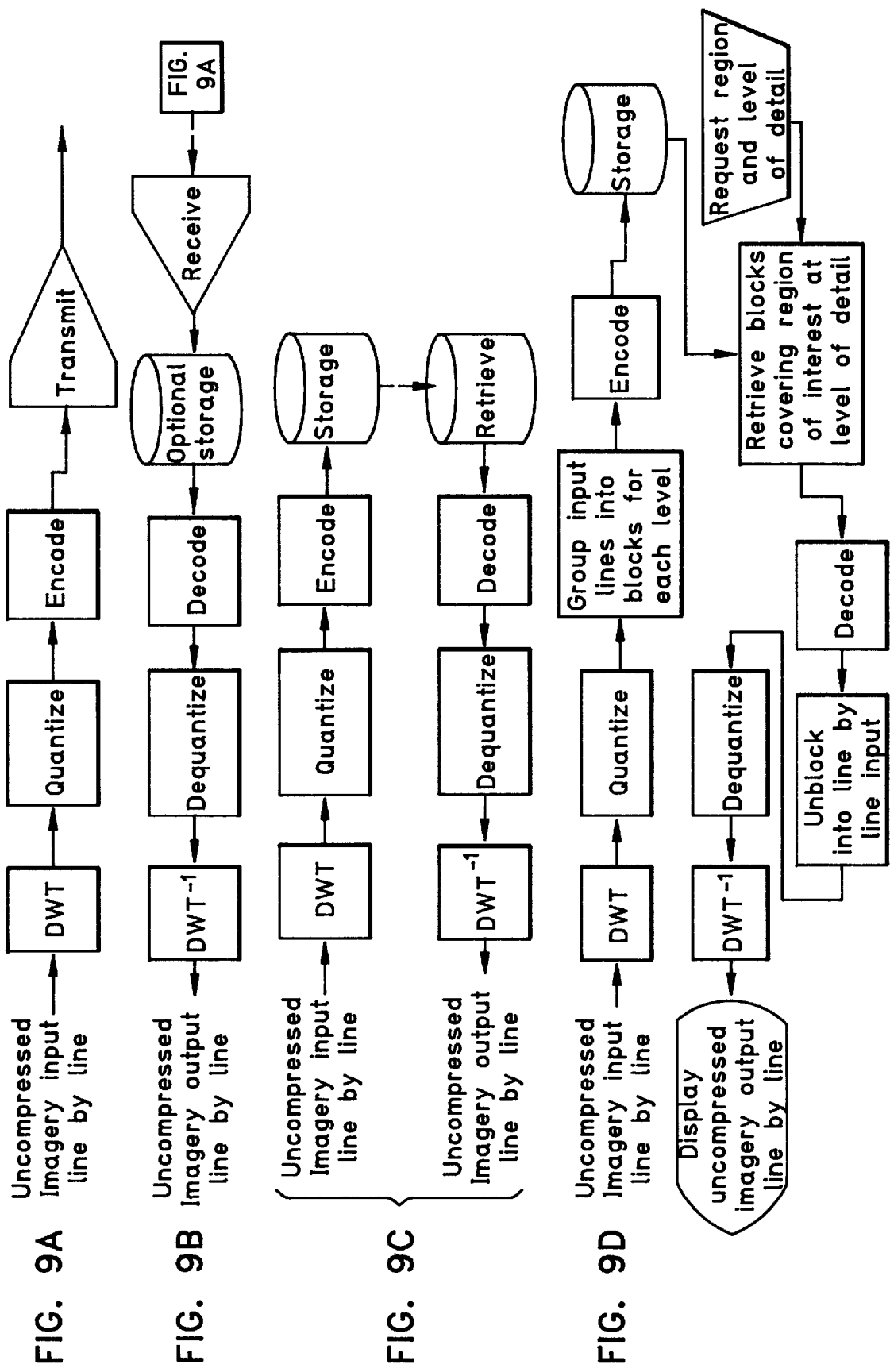

TRANSFORMATION AND SELECTIVE INVERSE TRANSFORMATION OF LARGE DIGITAL IMAGES

BACKGROUND OF THE INVENTION

This invention relates to the transformation and selective inverse transformation of very large digital images that may consist of 1,000,000 or more pixels across, and of a potentially unlimited number of lines in length.

With the introduction of commercial one meter resolution satellites, and the need to mosaic multiple very high resolution images together to gain a regional view, the size of images has increased to the point that terabyte ($2^{40}$) and larger digital images are becoming common. The term "digital image" refers to any form of data that can be represented using a two or more dimensional grid. Other types of high volume imagery include seismic surveys and hyperspectal imagery.

The need to transform, compress, transmit and/or store, and then decompress and inversely transform selective areas of such large digital images is an essential requirement in many applications, such as for GIS processing and for reception of imagery from satellites with limited transmission bandwidth and compute power.

PRIOR ART

Image transformation typically involves one or more steps of filtering that extract characteristics from an image by sifting the image components in a systematic way. In FIG. 1 an original image I(x,y) 10 is filtered in a compound step in which a first filtered image I' 12 is produced by applying a filter to the image I and a second filtered image I" 14 is obtained by filtering the image I'. The image I (and the images I' and I") are illustrated as multi-dimensional arrays of picture elements, called "pixels". Each pixel represents a correspondingly-located picture element of a visible image that may be observed by the eye. The image I is a two-dimensional array of pixels that is divided into horizontal elements. Each horizontal element—called a "line"—is one pixel high by n pixels long. In FIG. 1, the image 10 includes consecutive lines denoted as L10, L11, L12, L13 and L14 (among others). A pixel 11 is included for illustration in line L10, it being understood that every line is comprised of an equal number of pixels such as the pixel 11. The pixels of the image 10 are digital numbers that represent the magnitudes of elements of visibility such as brightness, color content, and so on. Thus when applied in sequence to a digitally-driven display device, each pixel causes generation of a spot that is a portion of the image I at a corresponding location. These spots are the visual pixels that make up the visual image to which the digital image I(x,y) is the counterpart.

The image 10 may be filtered for a number of reasons, for example in order to eliminate one kind of information so that another type of information may be emphasized. Two kinds of filtration are lowpass filtration and highpass filtration. Lowpass filtration reduces or eliminates information above a certain frequency in an image. Highpass filtration does the opposite.

For purposes of illustration, the images 12 and 14 are illustrated in the same format as the image 10, that is they are shown as being comprised of lines of pixels. The pixels of the filtered images 12 and 14 are produced by applying a filter to image pixels. Although the filters are, in practice, complex equations that receive the digital numbers representing pixels and produce digital numbers that are the pixels of the filtered images, it is useful for an understanding of this art to present the filters as discrete apparatuses that can be positioned on and moved with respect to the lines of an image.

Refer now to FIGS. 1 and 1a. A filter 13 is applied to the unfiltered image I(x,y). As represented in FIG. 1a, and by example, the filter 13 could have three components, denoted as a, b, and c. These components are termed "filter coefficients", and each is represented in a filter equation by a number. The filter 13 is oriented vertically with respect to the image 10 so that it spans three lines. To filter the image 10, the filter is advanced along the three lines, producing, at each pixel position a filter output in the form of a digital number. The digital number output by the filter 13 is a combination of three products. Each product is obtained by multiplying the value of a coefficient by the digital number of the pixel (P) with which the coefficient is aligned. The combination of products may be arithmetic or algebraic; for example, it may be produced by adding the signed values of the products. Each filter output is the digital number for a pixel in a filtered image. In this example, assume that the filter output P' is the digital value for the pixel of the filtered image 12 at the location that corresponds to the pixel aligned with the coefficient b. As the filter 13 is advanced through the image 10 along the lines that it spans (three in this example), toward the right edge, it produces a line of pixels for the filtered image 12. When the filter 13 reaches the right edge of the image 10, its position is shifted downward (by one line in this example) and it is returned to the left edge of the image 10. Now it is moved ("scanned") from left to right along the lines L12, L13, L14 of the image 10 to produce the next line of pixels for the filtered image 12. In this manner, the image 12 would be produced by scanning the filter 13 along the lines of the image 10 in a sequence from the upper left hand corner of the image in the manner described until the pixel at the lower right-hand corner of the image 10 has been filtered. At the upper and lower edges of the image 10, the filter 13 is positioned so that the coefficient b is aligned with the line at the edge. Along the upper edge, the product produced by the coefficient a would be assigned a predetermined value; similarly, along the lower edge, the product produced by the coefficient c would be assigned a predetermined value.

Assume for illustration that the filtered image I" is produced by a filter 15 that has three coefficients and that is oriented vertically on the image I'. Assume further that the line L12" is produced by the filter 15 scanning the three lines L11', L12', L13'. In turn, each of these lines is produced by filtering three corresponding lines of the unfiltered image I(x,y). For example, the line L11' is produced by filtering the lines L10, L11, and L12. Manifestly, in order to produce line L12', three lines of the image I' must be available, that is the lines L11', L12' and L13'; in turn, in order to produce these three lines, five lines of the unfiltered image I(x,y) must be available—the lines L10, L11, L12, L13 and L14. In the prior art, advantage has been taken of this relationship.

FIG. 1 illustrates a prior art compound filter apparatus that is incorporated into the ER Mapper product produced by the assignee of this application. In the prior art compounded filtration apparatus of FIG. 1, the filters 13 and 15 are implemented algorithmically in filter functions 16 and 18. As an input to each filter function (or as an integral component thereof), a buffer is provided that stores only the consecutive image lines of the preceding image that are necessary to perform the filter function. Thus, the buffer 16a needs a capacity of only five lines of the unfiltered image I(x,y), while the buffer 18a needs a capacity of only three lines of the filtered image I'. Further, the buffers 16a and 18a are managed in real time in such a manner as to reduce the memory requirements for a processor performing the filter functions 16 and 18. Thus, as the unfiltered image I(x,y) is being acquired line-by-line, the buffer 16a is managed as a first in—first out (FIFO) queue to store the five lines of the image 10 that are necessary to produce the three lines of image 12 that will produce the one line of the image 14. Similarly, the buffer 18a is managed as a three-line-deep FIFO queue. Management of the buffers 16a and 18a synchronizes their operations and recursively updates their contents each time a line of the image I" is completed. This eliminates the need to accumulate entire images in CPU memory. Instead, as lines are removed from the buffers 16a and 18a and as lines are completed for the image I", they are transmitted. In sum, in order to completely filter the image 10, the amount of computer memory space that must be allocated to support the filtering procedure can be computed by totaling the sizes of the buffers required to store the image lines that are currently being processed. For the example of FIG. 1 the total includes the five lines comprising buffer 16a, the three lines comprising the buffer 18a, and the one line of the filtered images I" that is currently being produced.

The filters 13 and 15 have been specified for the purposes of illustration only. In fact, digital image processing filters may be constructed as one dimensional arrays that scan multiple pixels of a single line, or as two-dimensional arrays that scan multiple pixels of each of a plurality of lines. Hereinafter, the number of coefficients or taps of a digital filter will be referred to as "filter length" or as "filter size". Filters of the kind illustrated in FIG. 1 are also referred to as "spatial" filters, because the algorithms that produce their results take into account the information contained in a group of spatially related elements—for example, adjacent pixels.

Image transformation techniques based upon subband image processing have been used in the prior art. In one such technique, a number of "subband" images are created by processing an image, using spatial filters that halve the spatial information content for the image in each grid dimension. This technique is known as discrete wavelet transformation (DWT). For a given image level, one of the subband images contains residual spatial information, which is in turn reduced to a smaller sized set of subband images. This process is continued until the subband images equal the size of the spatial filters being used to produce the subband images. Each subband image can then be compressed by selectively quantizing the subband image and then encoding the quantized subband image. Image compression is achieved by the quantization and encoding stages, following the computation of the DWT.

For very large images, several difficulties arise in the computation of the DWT. The prior art includes methods for computation of the DWT where data representing the entire image is stored in computer memory while the DWT is carried out, or where the computation of the DWT is achieved by dividing the image into a series of tiles, computing the DWT on each tile, and then adding in portions of the DWT from neighboring tiles to result in a seamless DWT.

For very large images, both techniques impose several restrictions that prohibit or limit their use. For example, for a single band eight-bit image of dimensions 1,000,000×1,000,000, the total image size is one terabyte (TB). Assuming a high quality 64-bit floating point-based DWT, storing the entire image in computer memory during transformation would require four TB of computer memory to effect the computation. The prior art tile-based neighborhood add back DWT transformation technique limits overall performance for two reasons. First each tile may have to be stored to slower disk storage and then retrieved to perform the neighbor add back operation, thereby slowing the transform operation. Second, by the need to store intermediate tiles on disk prevents tile-based prior art being used in applications with no disk storage, such as satellites. Some applications, such as continual scanning of the earth using an imagery satellite, allow for only a single sequential pass over the source imagery, rendering the multi-pass tile technique of limited use.

Furthermore, neither technique is well suited to applications which (a) require a guaranteed number of pixels/per second of compression and/or (b) a higher performance rate for compression by taking advantage of multi-CPU computers to carry out the DWT operation in parallel. This is because the prior art structures data in such a way as to be inefficient for multi-CPU operations.

SUMMARY OF THE INVENTION

In accordance with the present invention, a method is provided for the seamless wavelet based transformation and selective inverse transformation of very large images.

Accordingly, it is an object of the present invention to provide for the ability to transform images with large widths, and of any length.

A further object of the present invention is to permit performance improvements to be carried out during transformation and/or inverse transformation by the use of multi-CPU computers.

Another object of the present invention is to permit selective inverse transformation of images based on a subset region of interest and based on a subset level of detail.

It is another object of the present invention to provide for the ability to carry out continual real time transmission of compressed imagery in environments such as satellites which have limited computer power and no disk based storage.

To achieve the foregoing objects, the invention is embodied as:

1. A sequential line and level recursive method for computing DWT based transformation on large images without the need for large amounts of computer memory and without the need for intermediate tiles.

2. A method for inverse transforming a subset of the transformed imagery to a subset level of detail.

3. A method for optimizing the computation of image transformation or inverse transformation by applying multi-CPUs to selected stages of the recursive transformation or inverse transformation operation.

4. A method for real time continual transmission of compressed imagery or for storage of compressed images on hard disk.

BRIEF DESCRIPTION OF THE DRAWINGS

FIGS. 9A–9D are system block diagrams illustrating four exemplary application of recursive DWT processing according to the invention.

DETAILED DESCRIPTION OF THE INVENTION

As DWT transformation is an integral part of the invention, the process is first described here. In this document DWT transformation is performed by a "wavelet transform process".

For a given image I(x,y), DWT computation is accomplished by creating subband images that each equal D(x/2, y/2) in dimensions. Each of these is generated from the original image by a spatial filter which decimates the image by a factor of two over each dimension. One common form of DWT computes four subband images. This is the form used to illustrate this invention, although the invention applies equally to other forms of DWT that produce different forms and numbers of subband images. Similarly, one embodiment of the invention transforms and inversely transforms two-dimensional images, although the invention applies equally to one or multidimensional images.

One of the four subband images (the "LL subband image") is a reduced resolution version of the original image. For transformation, the DWT process is applied recursively to the LL subband image from a previous level, until the LL subband resolution is no larger than the spatial filter being applied.

A common step in DWT transformation prior to generation of the subband images is to first generate intermediate results in the form of lowpass and highpass images derived by filtration of the original image, decimated by two in one dimension while remaining the same size as the original image in the other dimension. The subband images are then generated from the lowpass and highpass intermediate images, this time decimating in the other dimension, with the resultant subband images being half the dimensional size of the original image.

Figures 1, 1A, 2:
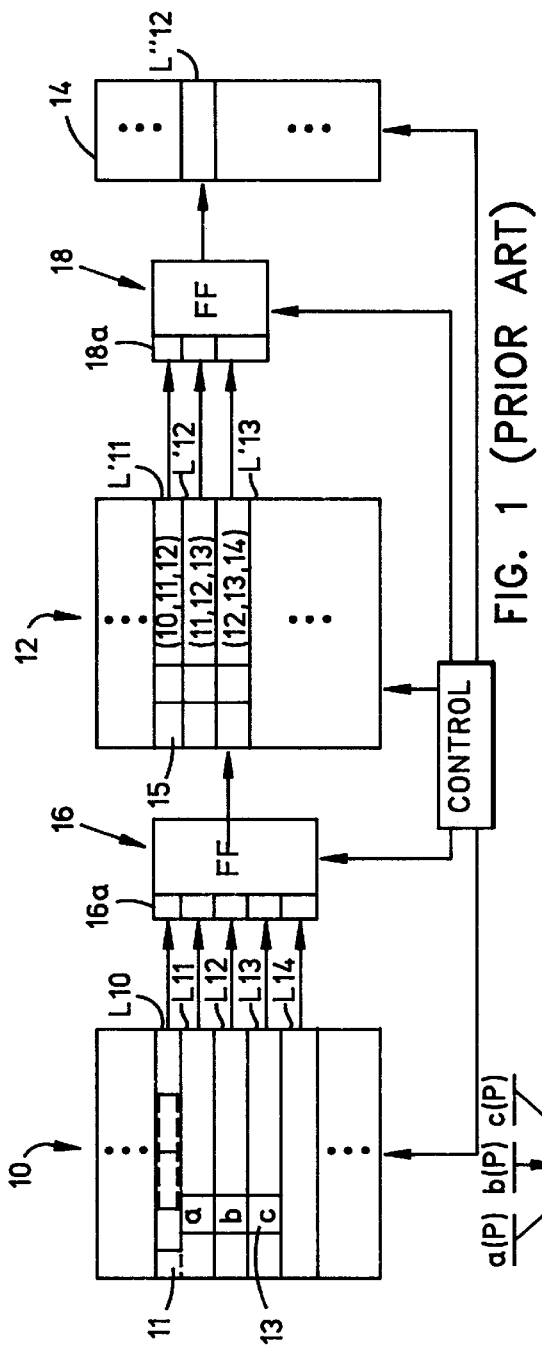
FIG. 1 illustrates a prior image processing system with multi-stage filtration of an original image.
FIG. 1A is a schematic representation of a filter with three taps used for image filtration in the system of FIG. 1.
FIG. 2 is a schematic representation of discrete wavelet transformation (DWT) illustrating a four subband image example.

With reference to FIG. 2, DWT transform computation is illustrated for the form of the algorithm that computes four subband images. An original image I(x,y) 20 has a width x and a length y. The width x corresponds to the number of pixels in a line, the length y corresponds to the number of lines in the image. DWT processing derives four images from the image I(x,y). These images are denominated as the lowpass/lowpass (LL) image 22, the lowpass/highpass (LH) image 24, the highpass/lowpass (HL) image 26, and the highpass/highpass (HH) image 28. These images are also termed "subband images". Each subband image is represented for this discussion by a two-dimensional matrix of pixels. The pixels of the subband images are derived by filtration of the pixels of the image 20. Each of the subband images 22, 24, 26 and 28 has dimensions (x/2, y/2). In other words, in terms of pixels and lines, the dimensions of each subband image are exactly one half the corresponding dimensions of the original image. Taking the image 20 as the original image, the four subband images 22, 24, 26 and 28 comprise the images of the first level $L_1$ of a multilevel DWT computation.

Typically, DWT computation derives the subband images 22, 24, 26 and 28 by producing intermediate results in the form of a lowpass image 21 and a highpass image 23. Assume for illustration only a lowpass filter (LPF), indicated by 25, having three coefficients. The lowpass image 21 is obtained by orienting the filter 25 horizontally and then scanning each line of the original image 20. However, after each filtration step, the location of the filter 25 for the next step is incremented by two pixel locations. Thus, assuming that the filter 25 is initialized as shown in FIG. 2, with the coefficient a yielding a default value, the value of the first pixel in line LP1 of the lowpass image 21 is obtained by the filter 25 when located as illustrated in FIG. 2. The next pixel in the line LP1 is obtained by incrementing the position of the filter 25 two pixel positions to the right along line LL1 so that it spans pixels 2, 3, and 4 of the line. In this manner, x/2 pixels are obtained for each line of the lowpass image 21. However since each line of the original image 20 is scanned, the lowpass image 21 has y lines. The highpass image 23 is obtained by a highpass filter (HPF) oriented horizontally that scans each line of the initial image 20 in the manner just described for the LPF 25. However, the initial position of the HPF is offset laterally by one pixel position from the initial position of the LPF 25. In this manner, y lines of x/2 pixels each are obtained for the highpass image 23. Manifestly, incrementing the location of the filters as they scan the original image 20 by two pixel location divides the number of pixels in each line in half, thus yielding the dimension x/2 in the lowpass and highpass images. This is referred to as "decimation". The subband images 22, 24, 26 and 28 are obtained by filtration of the lowpass and highpass images 21 and 23, with the orientation of the filters rotated by 90° with respect to the orientations of the filters that process the image 20. In this regard, consider the LPF 27, which is oriented vertically to span three lines of the lowpass image 21. The LPF 27 is scanned from left edge to right edge of the lowpass image 21, generating pixels for corresponding lines of the LL subband image 22. When one scan is completed, the filter 27 is returned to the left edge, but is incremented downwardly by two lines and then scanned from left to right. In this manner, y/2lines are generated for the LL subband image 22. The LH subband image 24 is obtained by highpass filtration of the lowpass image 21 using an HPF whose initial position is one line below that of the initial position of the LPF 27. The filter is then scanned from left edge to right edge of the lowpass image 21, and its position is incremented downward by two lines at the end of each scan so that y/2 lines of x/2 pixels each are generated for the LH subband image 24. The HL subband image 26 is obtained by lowpass filtration of the highpass image 23, with scanning of the image as described for lowpass filtration of the LL subband image 22. This yields the HL subband image having dimensions (x/2, y/2). The HH subband image 28 is obtained by highpass filtration of the highpass image 23 in the same manner that the lowpass image 21 is scanned to obtain the LH subband image 24. As per FIG. 2, therefore, the first level $L_1$ of subband images is obtained by generating an intermediate filtration product comprising the lowpass and highpass images 21 and 23, and then filtering those images as described. The next level, $L_2$ is obtained as just described, using LL subband image 22 as the original image. Indeed, for each level, the LL subband image of the previous level is used as the original image, and the original image 20 itself can be considered the prime, or first LL image.

Transformation/Inverse Transformation Invention

This invention enables the transformation and inverse transformation of very large images. It does so by implementing the recursive Discrete Wavelet Transformation (DWT) in a line-by-line fashion, with the result being a fully constructed sub-level DWT for each line. The image can be of any or unlimited length.

The invention provides the ability to perform recursive DWT and inverse DWT operations on very large images which have a very wide number of pixels across each line, and are of potentially unlimited length. The DWT process is a step in wavelet based image transformation, and the DWT output is used by other steps (quantization and encoding) to carry out image compression and decompression.

Transformation occurs by applying a recursive DWT on a line-by-line basis, generating the full set of sub-level DWT lines. These smaller level DWT outputs can be used for selective inverse transformation.

A primary feature is that transformation and inverse transformation operate using pre-allocated and therefore fixed amounts of computer memory. Neither operation requires secondary storage.

Transform Method

The transform method portion of the invention exploits three key aspects of the DWT computation, by observing that:

1. Generation of the DWT does not require input of the entire original image or large tiles of the original image. Instead, the generation of one or more pixels at the lowest DWT level requires only enough input imagery to cover the spatial filter size. For processing efficiency, one embodiment of the invention performs the DWT on one or more entire lines of input rather than on a single pixel; however this is an implementation choice, not a restriction of the invention.

2. The computation of the DWT for a pixel of a DWT level decimates the input DWT level LL value by two pixels in one dimension, and the generation of the input DWT level LL value in turn decimates that level's lowpass and highpass values by two lines in the other dimension. This enables the DWT to be performed in a recursive fashion by only requiring a finite amount of input image pixels at each level.

3. Only the LL subband is required to generate the DWT for a smaller DWT level. Thus, once the LH, HL and HH subband values for a DWT have been generated, they can be immediately compressed (quantized and encoded), or transmitted or stored as required. Furthermore, since the DWT operation is invertable, an inverse transform operation ($DWT^{-1}$) creates the LL image for any level from the four subband images of the previous level. Therefore, once the LL subband value for a level has been used in computation by a smaller DWT level, it may be discarded, save at the lowest level where the LL subband value is processed in the same manner as the other subband values.

The transform method of the invention thereby operates by sequentially requesting a single line of LL output for the smallest DWT. The smallest DWT in turn requests two LL lines of input from the next larger level, and this recursion continues until the largest level requests two image lines from the source image. Once a level has obtained two larger level LL subband lines, the level then creates the LL, LH, HL and HH subband lines. The LH, HL and HH subbands are compressed and then disposed of (by transmission or storage, for example). The two LL input lines are discarded, the level returns the generated level LL line to the smaller level, and the process continues in a recursive fashion.

In order to generate the LL, LH, HL and HH subband lines for a given level, the DWT level must first generate two lowpass and two highpass lines from the two LL subband lines passed to the DWT level from the next larger level. The two lowpass and highpass lines decimate by two the two input LL lines in the x direction. The spatial lowpass and highpass filters that are applied are of Filter_Size in length, in the x direction.

For generation of edge values of the lowpass and highpass lines using the x direction spatial filters, the filters extend beyond the left and right edges of the input LL subband image line. Therefor, any of a number of edge condition extensions can be applied, including zero value, reflection, or extrapolation. The exact technique used normally depends on the type of data being compressed.

In order to generate the LL, LH, HL and HH subband lines for a given line, the level DWT must apply vertical y direction spatial filters to the lowpass and highpass image lines, decimated by two in the y direction. Therefor, to generate an output set of LL, LH, HL and HH lines, the level DWT must keep a set of size (Filter_size+1) of lowpass and highpass lines in memory. Thus, to process an output set of subband images, the level DWT discards the two earliest-produced lines from the buffer and adds the two lines most recently generated by two recursive calls to the larger (previous) level for LL input lines, which are spatially filtered and added to the set of lowpass and highpass lines. As Filter_size is small relative to the image size, and as the line size decreases by 2 at each smaller level, this set of lowpass and highpass lines kept in computer memory represents a small amount of computer memory. As for the x dimension edges, the start and end lines of the image can be reflected using any of a number of edge extension techniques.

Figure 3:
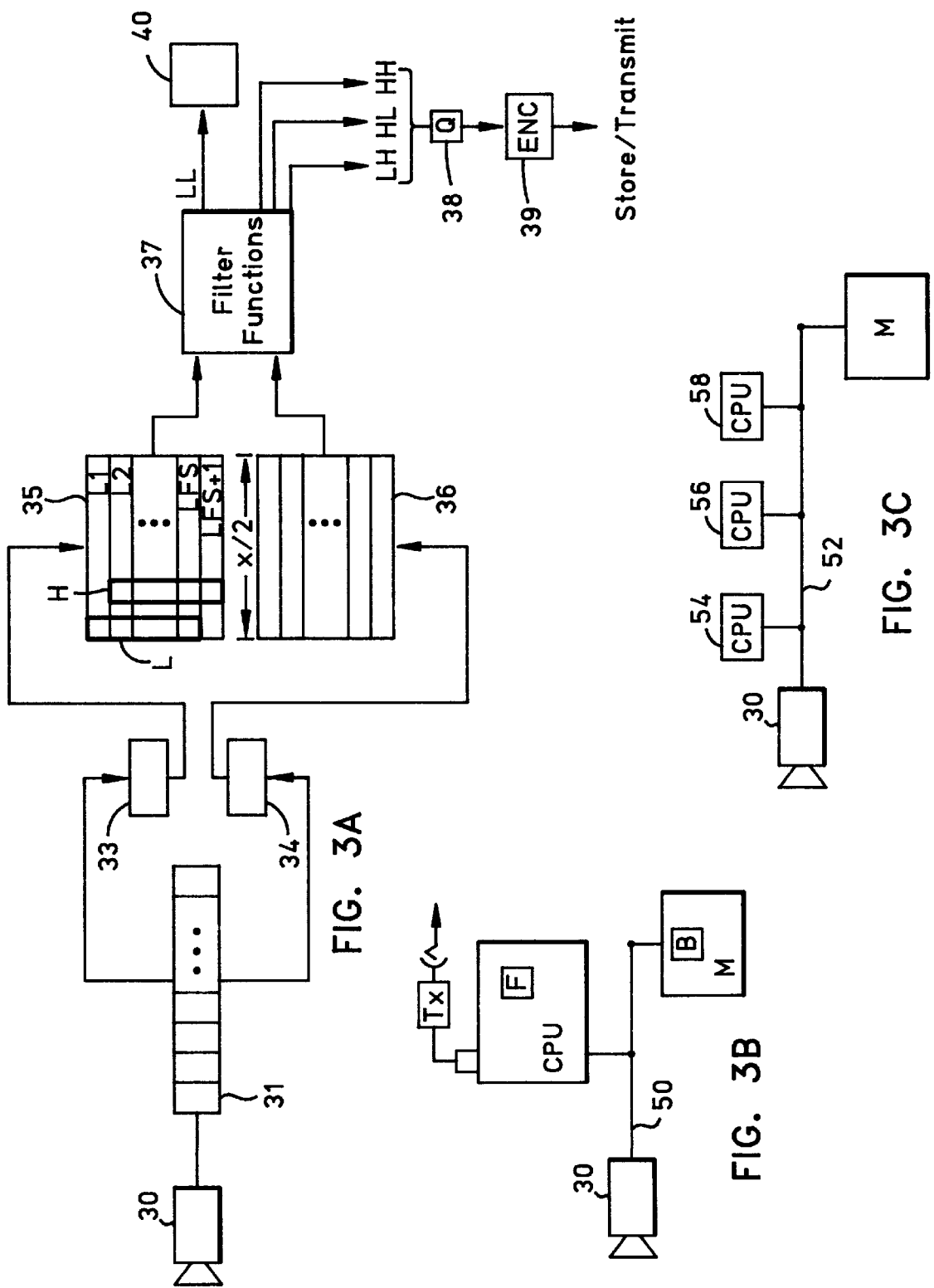
FIG. 3A illustrates recursive line-by-line DWT transform processing with buffer allocation according to the invention.
FIG. 3B illustrates a single processor system for performing the transform processing of FIG. 3A.
FIG. 3C illustrates a multiprocessor system for performing the transform processing of 3A.

FIG. 3A illustrates these relationships. In FIG. 3A, assume an image source 30 (such as a vidicon) or camera that acquires an image by viewing it and providing a counterpart in the form of an original image I(x,y) as described above in respect of FIG. 1. A line length buffer 31 receives the image I(x,y) line-by-line from the image source 30, making each line of the original image available to a first (lowpass) filter 33 that is oriented horizontally with respect to the line as discussed above in respect of FIG. 2, and to a second (highpass) filter 34 oriented in the same manner as the filter 33. As processing is completed on each line of I(x,y), it can be discarded since the information it contains has been preserved in the subbands of the DWT transform operation. I(x,y) can be reconstructed at another time and another place from the subband results.

Feeding the lines of the original image in succession to the filters 33 and 34 accomplishes the width-wise decimation of the original image and produces the lowpass intermediate results (output by the lowpass filter 33) and the highpass intermediate results (output by the highpass filter 34). The lowpass intermediate results comprise lines accumulated in a buffer 35; similarly, the highpass intermediate results comprise lines accumulated in the buffer 36. Because of decimation the width of each buffer is x/2. The length (depth) of each buffer is adequate to store the number of lines that are necessary for the vertically-oriented filters that produce that the subband images from the intermediate results. Taking the filters to be of equal size, assume that the vertically-oriented rectangle denoted by L represents a lowpass filter that is applied to the lowpass intermediate results to generate the LL subband image for the first level ($L_1$) of a DWT transformation. Recall that the LH subband image is generated from the same results by an equal-sized highpass filter H that is offset downwardly by one line from the position of the lowpass filter L. The filter size of the highpass filter H is the same as the filter size of the lowpass filter L, consequently both filters need (Filter_size) lines to generate a line of the LL subband image and the LH subband image. Because of the one-line offset between the filters L and H, one more line than (Filter_size) lines is required. Recall that the length of each line at this level is x/2. Identical considerations apply to the buffer 36. Each buffer therefore has a storage capacity of ((Filter_size+1)*(x/2)). Assuming allocation of processor memory space for the buffers 35 and 36, the memory requirement for this first level would be:

$$(2*((\text{Buffer size})*(\text{pixel size}))) \quad (1)$$

Given that the size of each buffer is the product of the number lines stored and the width of each line, equation (1) can be rewritten as follows:

$$(2*(\text{Filter\_size}+1)*(x/2)*P) \quad (2)$$

which further reduces, in the case of the example shown in FIG. 3A to:

$$((\text{Filter\_size}+1)*(x)*(P)) \quad (3)$$

where:
  Filter_size has been defined,
  x is the width of the original image to be transmitted, and
  P is the symbol size of the digital number of a filtered pixel To complete the description of FIG. 3A, once the necessary lines have been generated in the buffers 35 and 36, the DWT filter functions are performed according to the four-image subband illustration that sets the example for presentation of the invention. Accordingly a filter function element 37 generates a line each for the LL, LH, HL, and HH subband images. Since the latter three subband images are not required to generate lower levels in the DWT process, they may be compressed and stored or transmitted for later inverse transform processing. Thus as the DWT filter function 37 generates a sequence of pixels that make up the current lines of these three subband images, the lines may be further compressed by quantization at 38 and encoding at 39. The compressed lines may be stored, for example in nonvolatile direct access storage devices (DASD), or transmitted from the location where the DWT transform processing is taking place to another location where they may be stored in DASD. Concurrently with generation and compression of LH, HL, and HH data, the LL data must be accumulated and buffered to the extent necessary for generation of the next level of DWT transform subimages. This occurs at 40, which may comprise a one-line buffer of length x/2N, or smaller, where N is the number of levels for which subband results are output. The process is then cascaded from the output of 40 in as many stages as are required for the number of levels.

FIGS. 3B and 3C illustrate processor systems with which the wavelet transform process just described can be performed. It should be manifest to a skilled artisan that the processor system architecture of FIGS. 3B and 3C may be installed in platforms that are appropriate to the applications discussed below and other platforms that are appropriate to applications that will become evident upon an understanding of this invention. In FIG. 3B, a single processor system is illustrated in which the image source 30 is connected by way of a databus 50 to a processor system including a central processing unit (CPU), and a high-speed memory (M), which may comprise random access memory (RAM). The data that the CPU operates on in performing those functions is stored in buffers (B) in the high-speed memory M. Optionally, the CPU may also be connected to a transmitter (TX) for transmission of subband level results.

In FIG. 3C, a multi-processor architecture is illustrated where the image source 30 is connected by way of a databus 52 to a plurality of processors of which 54, 56, and 58 are examples. Each processor includes a CPU. A high speed memory M is also connected to the bus 52. A transmitter (not shown) may also be connected to the architecture to transmit subband level results. Those skilled in the art will realize that this is not the only form of multi-processor architecture that may be used with this invention. In this description, this architecture is also referred to as "multi-CPU" architecture.

In FIGS. 3B and 3C the image source 30 acquires a specified image line-by-line, providing the sequence of lines forming the image to the processor system to which it is connected. The processor system transforms the image data according to the recursive DWT transform operation discussed below processing results as appropriate for a selected application.

Given that the image x dimension size is fixed (specified) during the transformation operation, the method of the invention pre-computes the number of DWT levels for a specified image, which is defined as L=(log2(x)−log2(Filter size)), and pre-computes the width of each DWT level line, which is half that of the next larger level. As the Filter_size is also fixed during the transformation operation, the method of the invention pre-computes and pre-allocates memory space adequate for the number of lowpass and highpass buffers required, taking into account the size of each buffer.

The number of levels and the size of the x dimension of the original image dictate the amount of total computer memory required for all levels during the transformation operation. Additional buffers can also be allocated for storing one line of each LL, LH, HL and HH subband image to improve performance, but are not essential for the operation of the invention.

As the width of the largest DWT level lowpass and highpass set of buffers is half that of the original image x dimension size, and due to the halving in buffer width at each smaller DWT level, the total computer memory space (M) required for buffers for all levels can be expressed as:

$$M \leq ((2*(F+1)(x/2)*P)+(2*(F+1)(x/4)*P)+\ldots+(2*(F+1)(x/2N)*P)) \quad (4)$$

where:
  F is filter size,
  x is the width of the input image
  P is pixel size, and
  N is the precomputed number of levels
Equation (4) can be reduced as follows:

$$M \leq (((F+1)*x*P)(1+\tfrac{1}{2}+\tfrac{1}{4}+\ldots+1/N)) \quad (5)$$

which ultimately reduces to:

$$M \leq (2*(F+1)*x*P) \quad (6)$$

The following table represents memory requirements (M) for the lowpass and highpass set of buffers required for DWT transformation, for images of different dimensions, for a Filter_size of 7, and a pixel size in four byte floating point Value_width:

| Image X,Y dimensions | Uncompressed Image size | Memory requirements |
|---|---|---|
| 1,000 × 1,000 | 1 MB | 64 KB |
| 125,000 × 125,000 | 14 GB | 8 MB |
| 1,000,000 × 1,000,000 | 1 TB | 64 MB |
| 1,000,000 × any length | unlimited | 64 MB |

Implementation Of The Recursive Sublevel DWT Invention

The prior art techniques for DWT analysis and synthesis suffer from several undesirable problems:

1. Memory based techniques require the entire image to be in memory to perform the DWT analysis or synthesis. This is not practical for large images which could be of TB size, and not possible for images that are of effectively unlimited length (such as the continual scanning of the earth by a imagery satellite).

2. Tile based techniques require that the DWT operation be performed on tiles, which are then archived for later retrieval for generation of tiles immediately below or to the right of a given tile. This requires a disk-based architecture for storage and retrieval of intermediate results, which is not practical for applications with no disk storage. The disk based storage and retrieval of tiles also slows the DWT analysis process down.

3. Neither technique easily generates sub-level DWTs, which are desirable for improved compression, and for interactive extraction of selected sub-regions at a selected level of detail (LOD).

The recursive sublevel DWT transformation and inverse transformation of this invention rests on two key observations:

1. The generation from a single input line of one line each of the lowpass and highpass intermediate line requires only one input line if the filter bank is applied in the x direction. In turn, only FILTER_SIZE+1 input lowpass and highpass intermediate lines are required to generate one line each of the LL, LH, HL and HH subband output if the filter bank is applied in the y direction to the lowpass and highpass intermediate lines used as input to generate the LL, LH, HL and HH subbands.

2. Given observation (1), and given that generation of one line of a given DWT level downsamples input by a factor of 2, it is possible to recursively generate sublevels by storing (FILTER_SIZE+1) input lines in memory buffer. For the generation of one output line of LL, LH, HL and HH subbands, two input lines are discarded from the memory buffer, and two more are loaded. Given that a smaller sublevel is half the size of the next larger level, it follows that for LEVELS number of sublevels to be generated, a predefined amount of memory equal to 2*((Filter_size) (image width)*P) needs to be allocated in order to achieve recursive generation of DWT levels.

Figure 4:
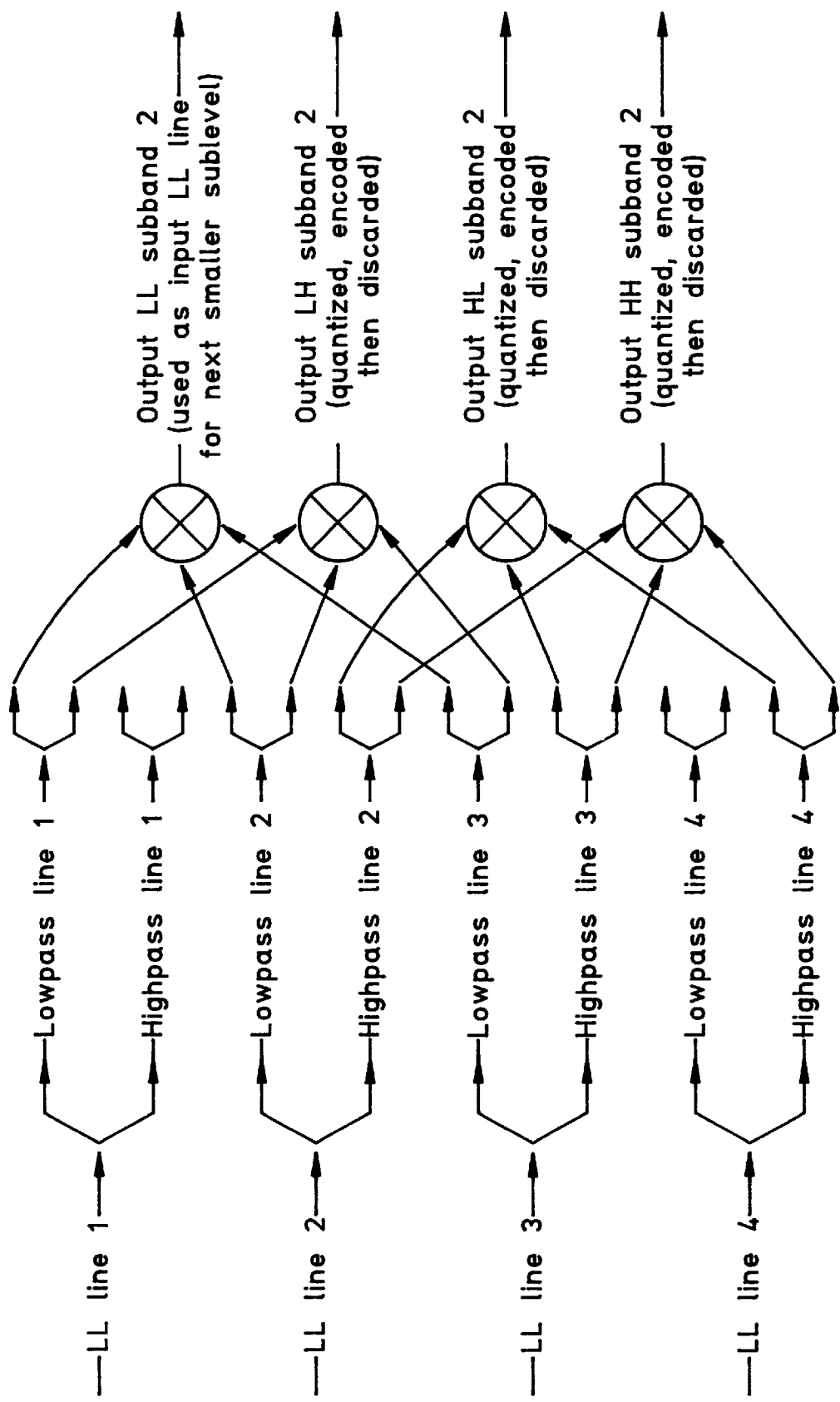
FIG. 4 is schematic diagram illustrating generation of subband lines in a DWT transform having subbands comprising four subband line outputs.

FIG. 4 demonstrates the subband generation, for a single DWT sublevel, using a 3 tap FILTER_SIZE. To process the next line of output, two input lines would be discarded (LL line 1 and LL line 2), and two input lines would be read (LL line 5 and LL line 6). This process continues until all input lines have been read.

This process is carried out recursively: The output LL line for a given level is used as an input line to the next smaller level, and the output LH, HL and HH lines are quantized, encoded, and then discarded.

When a filter bank is processing values to the left or the right of the input, or the very start or the very end lines, any of the standard wavelet techniques such as reflection can be used to ensure continuity for the filter bank.

Figure 5:
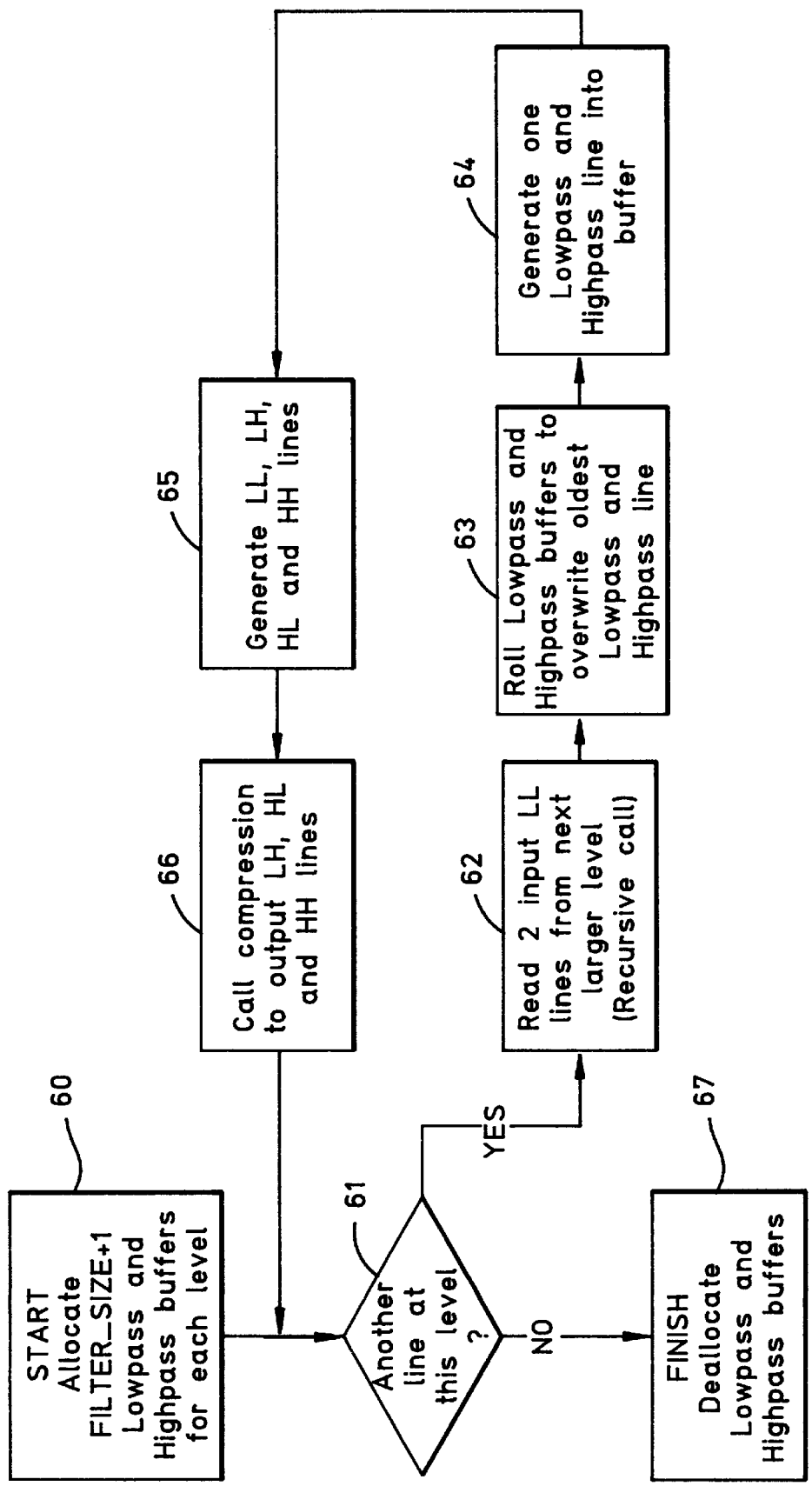
FIG. 5 is a flow diagram illustrating a computer-executed method for recursive generation of DWT sublevels according to the invention.

The recursive sublevel DWT analysis operation for transformation performs the above operation in a recursive fashion, for one line of each output LL subband line, as shown in the process of flow diagram of FIG. 5. The recursive operation for transformation is also illustrated in the pseudo code table below. Both the process flow diagram of FIG. 5 and the pseudo code illustrate a software program that may be embodied as executable code written to or stored on a storage medium. Such a program may be written in a high-level computer language such as the C++ language, entered into a computer, compiled, and executed by the computer.

With reference to FIG. 5 and to the pseudo code table, the input image is specified in terms of width (x) and height (y), buffer space in computer memory is allocated in step 60 and the recursion is entered at decision 61. The recursion is performed at each level, testing whether another line is to be generated. This begins at the lowest level and cascades upwardly through each level, triggering recursive reads of lines at the higher levels, all the way up to the line of the original image being input, for example, in the buffer 31 of FIG. 3A. For so long as lines are being input to the transform process, the positive exit will be taken from the decision 61, and two LL lines from the next larger level will be read, creating lowpass and highpass intermediate results that will be entered into the lowpass and highpass buffers as most recent results in step 63. If, for example, ring buffer configurations are used, the buffer contents will be incremented to overwrite the oldest lines, and the new lines will be generated and entered into the buffer (step 64). Once the most recently-generated intermediate lines have been buffered, the subband lines are generated in step 65. Now the LH, HL, and HH lines that have been generated in step 65 can be transmitted or stored, either step being preceded by compression at step 66. Of course, if the transform results are to be immediately employed, the compression step can be skipped and the recently-generated subband results can be provided to a consuming process.

The recursive sublevel DWT synthesis operation for inverse transformation is performed in a similar way to recursive operation, except that that recursion occurs from the largest desired sublevel towards the smallest level.

It will be observed by those skilled in the art that the invention can also be applied to imagery that varies in size in the x direction, at the expense of re-computing the new number of DWT levels and level image width each time the x dimension size changes.

It will be observed that the invention processes the image input a line at a time. As such, the invention places no restriction on the number of lines of the input image. Therefore, one embodiment of the invention can be applied to transformation of a continual stream of input image lines, such as will be generated by an earth imaging satellite continually orbiting the planet.

Figure 6:
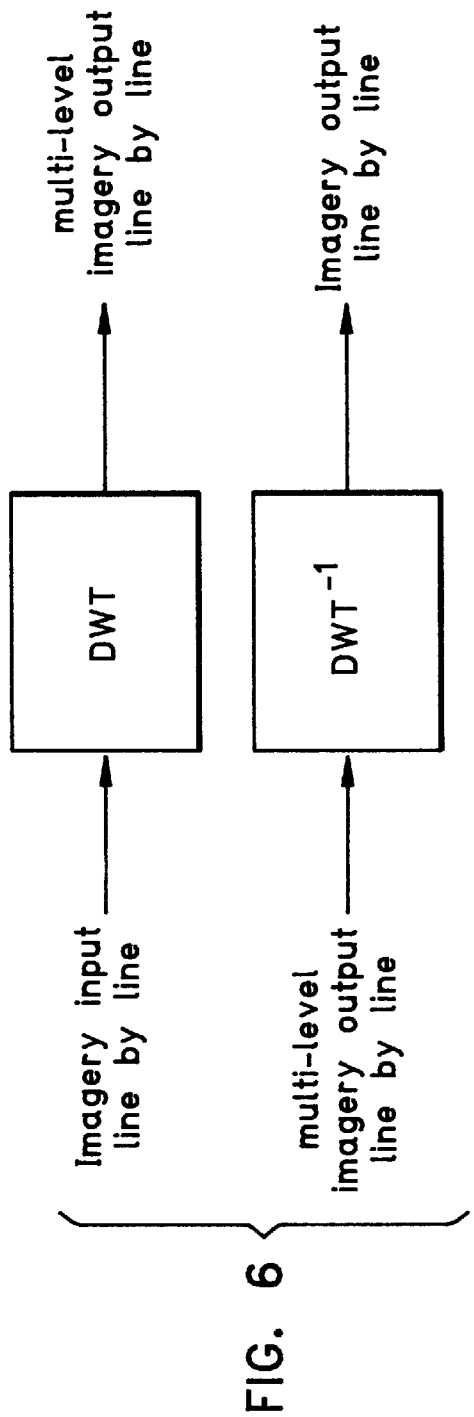
FIG. 6 is a block diagram illustrating DWT transformation and inverse DWT transformation.

As flow for DWT and inverse DWT is carried out on a line-by-line basis, as shown in FIG. 6, no DASD storage is required, and only fixed amounts of RAM are required, during these operations. If the quantization and encoding steps (for compression) or decoding and dequantization steps (for decompression) are also carried out on a line-by-line basis, then no DASD storage is required and the compressed transformed image can be immediately transmitted and received in a compressed, transformed fashion.

Figure 7:
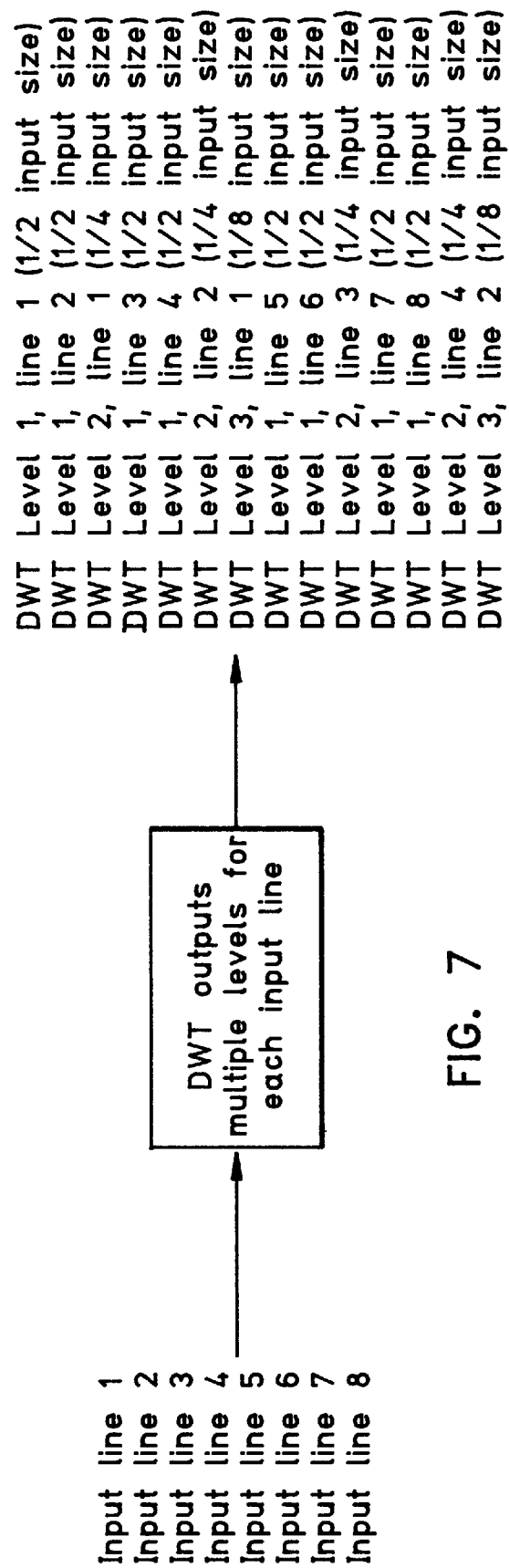
FIG. 7 is a block diagram illustrating the sequence of output lines and levels generated by DWT transform processing in response to an input comprising a sequence of image lines.

There will be multiple output DWT lines from one input DWT, as recursive levels of DWTs are generated in order to improve transform potential and to enable selective inverse transformation. The diagram shown in FIG. 7 shows the output generated for three levels during transform operation. The largest output level is ½ the input image line width, the second largest output line is ½ the width of the largest output level, and so on.

Real Time Compressed Image Transmission and Storage

As the entire set of subbands for a given input image line is made available for compression (quantization and encoding) before the DWT is performed for the next image line, the invention enables real time compression of subband image lines and either transmission or storage of each compressed line, for later selective decompression and inverse transformation.

For real time compressed image transmission, the following features enable real time compression:

1. Compression can be carried out at a variable rate for each line should transmission buffer overrun be anticipated.

2. Compression can be adjusted in real time on a line by line basis to adjust and throttle to varying available transmission rates.

For storage to DASD, subbands for a level can be written as a plurality of blocks. By reading the subbands for the smallest level first, the subbands for the second smallest level second and so on, the inverse transformation operation can read the logical blocks from storage in a recursive fashion, and stop the decoding process at the level of detail required.

Inverse Transformation Method

The inverse transformation method uses a recursive technique similar to the transformation method, which is reversed in order to inverse transform. The inverse transformation method operates as follows:

First a subset of a transformed image is passed to the inverse transformation operation. This is defined as a subset of subband image lines, and a subset within each image line, and a level of detail to inverse transform. The level of detail may be any number ranging from 0 to the number of levels in the transformed image, and represents a power of two decimated view of the image to be provided.

As with the transform method, a set of buffers is allocated to store enough lowpass and highpass lines to recreate the higher level LL imagery. These only need to be created for the levels within the defined level of detail, not for all levels.

The inverse transformation operation requests each line at the level equal to the desired level of detail. The inverse DWT level routine recursively requests a single smaller level LL input line, and this process recurses until the smallest level returns the LL values for the line from the transformed image source, which may be from hard disk or from a continual transmission source.

Each inverse DWT then regenerates two level LL lines from the level LH, HL, HH subband lines and the LL subband line returned from the recursive call to the next smaller level.

In one embodiment of the transform method and the inverse transform method, a 15 tap transform filter is used and a 3 filter tap inverse transform filter is used. This enables high quality transformation and high speed inverse transformation, with smaller buffer sizes required for the inverse process.

The Compression and Decompression Process

In order to achieve benefits beyond those realized by DWT processing, each DWT output line may be compressed by being quantized, and then encoded.

Depending on the final application, the compression and decompression operations may be coupled with several other stages. Two of these stages, quantization and encoding (for compression) and decoding and dequantization (for decompression), are always required if the wavelet transformed image is to be compressed. The other stages, being blocking/deblocking (for selective region and level of detail retrieval), transmission/reception (for transmission of compressed images) and storage/retrieval (for archive) are used or not used depending on the application requirements.

Figure 8:
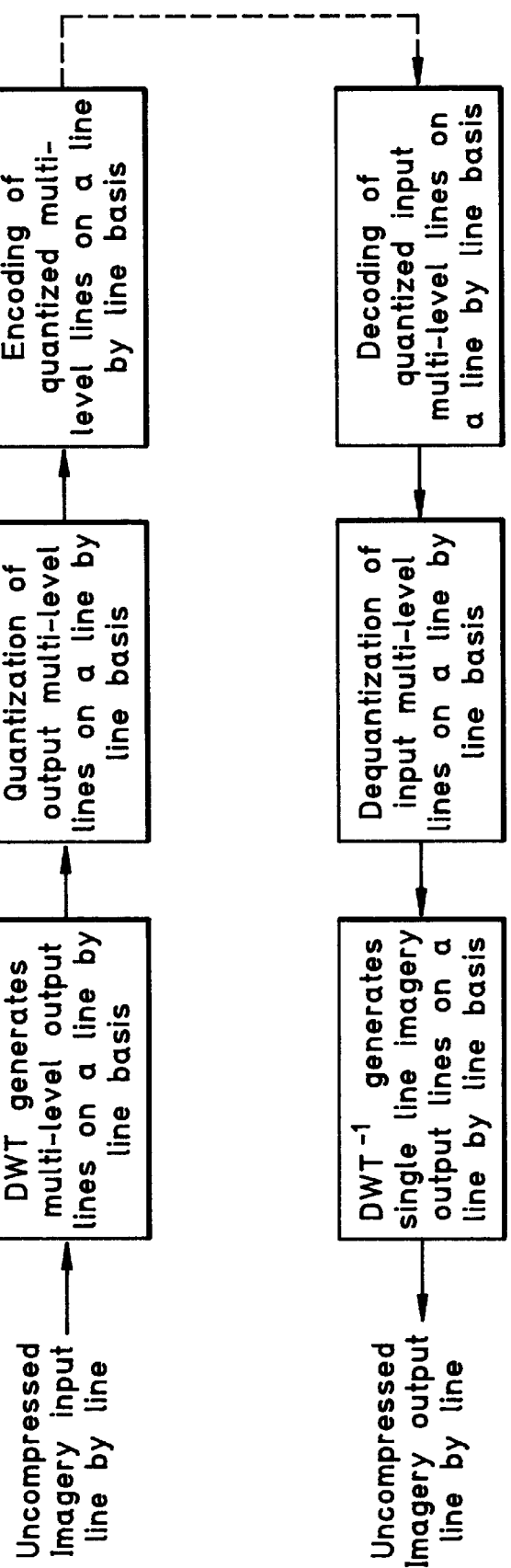
FIG. 8 is a system block diagram illustrating the minimal number of system elements required to compress and decompress lines of an image subjected to DWT transformation.

FIG. 6 shows the absolute minimum set of system elements needed to (a) convert an image to wavelet transformed space using the recursive DWT and (b) convert a wavelet transformed image back to an image using the recursive $DWT^{-1}$. This may be useful in applications wishing to operate on the imagery in the wavelet space domain, as it carries out no compression. FIG. 8 shows the minimal set of system elements required to compress and then decompress a stream of input lines generated by a DWT operation. It is important to appreciate that none of these elements requires DASD storage as an essential part of the operation. In the system illustrated in FIG. 8, only sequential lines of input imagery for compression, and sequential lines of multi-level compressed wavelet space lines for decompression are required.

Different Application Implementations for the Invention

Compression and decompression of large images has a wide range of system applications. FIGS. 9A–9D show four examples of such systems:

1. Transmission of imagery in a compressed form from an earth imaging satellite is embodied in the system of FIG. 9A. In this application a processing system of either single or multi-processor architecture is placed in a satellite. The satellite is launched and placed into orbit. In orbit, imaging equipment begins to acquire an image. The image is processed during acquisition by the transform method described above. Because the compression technique operates on an unlimited length of lines, does not require DASD storage, only requires a pre-determinable amount of RAM, and can be implemented on multi-CPU or DSP architectures to improve performance, the invention is well suited to capture of imagery on a satellite, compression, and then transmission of the compressed imagery. Compression significantly reduces the amount of downlink transmission capacity required.

2. In the TV transmission system of FIG. 9B, transmission of high resolution imagery such as HDTV is enabled from a central transmission location for reception by multiple receiving locations by TVs. In addition to the features noted in respect of FIG. 9A, the decompression technique can be implemented using high speed dedicated DSP chips, making it cost effective to compress large amounts of imagery, thereby increasing the number of channels that can be transmitted with a given amount of transmission bandwidth.

3. In the image archive system of FIG. 9C, images, such as medical X-rays, are transformed and compressed for archival storage and later retrieval, where the entire image will always be decompressed.

4. FIG. 9D represents compression, storage, and later decompression of selected portions (blocks) of imagery at selected levels of detail to enable interactive browsing of the imagery. In this instance, additional operation stages are added to the compression and decompression to block data to enable fast retrieval of only those portions in the desired level of detail required for display.

Multi CPU Implementation of the Recursive DWT Invention

The invention provides high performance implementation of DWT analysis and synthesis, for the following reasons:

1. A given input LL line for any given sublevel DWT is read once, and processed sequentially from start to end to generate the lowpass and highpass intermediate line. This single pass and unidirectional processing ensure efficient usage of L1, L2 and CPU memory caching systems.

2. As soon as the input LL line is no longer required (after computation of the lowpass and highpass intermediate lines, and as soon as the generated LH, HL and HH subbands are quantized and encoded, they can be discarded (note, however, that the optional step of blocking the subbands for later selective retrieval may require storage of N lines where N is the number of lines within a set of blocks being 1 block high and M blocks wide).

3. Simultaneous access to the input LL line to generate the lowpass and highpass intermediate output enables efficient usage of CPU registers during the FIR calculation operation. In the same way, simultaneous access to the lowpass and highpass intermediate line to generate the LL, LH, HL and HH lines is also efficient.

As result of the above efficiencies, the invention is generally significantly more efficient and therefor faster than both prior art that performs the DWT on the entire image, and prior art that divides the image into tiles.

Notwithstanding this, the DWT analysis operation is time consuming, and it is desirable to gain further performance improvements.

These can be carried by the implementation of a multi-CPU version of the invention, and/or imbedding time consuming portions of the process into dedicated and high speed processing chips such as Digital Signal Processing (DSP) chips.

Multi-CPU and DSP implementations are implemented by observing the following key points about the process carried out by the invention:

1. The invention has a very simple structure, with a well defined processing sequence and time measurement. For example, in general the time to generate one LL line for a smaller DWT sublevel will be about ½ that to generate a LL line for the next larger level. Furthermore, the time to generate one line for all smaller DWT sublevels will be about equal to the time needed to generate one line at a given sublevel. This is because the sum of line lengths for all smaller sublevels will not exceed the size of a given level, due to the 2 times downsampling carried out at each level. Both of these key points make the task of splitting operations out to multiple CPUs and then resynchronizing to be simple, with very little wasted CPU idle time.

2. Once LH, HL and HH subbands have been generated at a level, additional CPU(s) can immediately start the quantization and encoding process for these subbands, either using one CPU to quantize and encode all subbands at a level, or further dividing the task to one CPU per subband. As soon as encoding is complete for the subbands, the information in those subbands can be overwritten during generation of the next line.

3. Generation of the lowpass and highpass intermediate lines can be carried out in parallel from a given input line at a given sublevel.

4. Generation of the LL, LH, HL and HH subbands can be carried out in parallel from a given input line at a given sublevel.

5. As only the LL subband is required by recursive calls (by smaller levels in the case of DWT analysis; by larger levels in the case of DWT synthesis), the processing can be carried out on this subband first, and then processing of the recursed sublevels can be released to other CPUs to perform.

6. Much of the process is single data source multi instruction multiple data output. This enables strong optimization using DSP chips with dedicated functionality in this area.

The result is that multi-CPU systems, with tightly coupled RAM systems, can expect almost linear performance increments for systems with 8×LEVEL CPUs, assuming sufficient RAM bandwidth.

Other Applications

To this point, the description has assumed that subband results are consumed by either a transmission process or a storage process, making compression particularly desirable. However, it is contemplated that the recursive transform and inverse transform described above may also be used to provide input to consuming processes where compression is not necessary either in whole or in part. For example, transformation of large images enables other forms of processing to be carried out as follow-on processing stages, consuming intermediate results produced by transformation. So the present invention is also applicable to other uses of DWT transformed images. Such applications may include, but are not limited to, machine vision, pattern matching, noise removal, and image feature matching. None of these applications requires compression, although some, such as noise removal, may employ quantization of subband results.

Pseudo Code

```
#define FILTER_SIZE 15 // size of FIR filter
main(char *input_file)
{
    int    input_x_size, input_y_size;
    int    dwt_levels;
    int    level, level_x_size, level_y_size;
    // open the input file and return size
    open_input_file(input_file, &input_x_size, &input_y_size);
    // work out number of DWT levels to create
    dwt_levels = compute_nr_of_dwt_levels(input_x_size, input_y_size);
    // pre-allocate buffers, one set per DWT level, to be able to
    // process one line. Each level is half the size of the previous
    // level in the X and Y direction. We need to buffer FILTER_SIZE+1
    // lowpass and highpass lines for each level
    level_x_size = input_x_size;
    for(level=0; level < dwt_levels; level++ ) {
        level_x_size = ((input_x_size+1) / 2); // decrease size by 2
        allocate_dwt_level_buffers(level, level_x_size);
    }
```

-continued

```
        // Get number of Y lines for the smallest level
        // This is (input_y_size / (power2(dwt_levels))
        level_y_size = compute_dwt_level_nr_lines(dwt_levels);
        // Now read the smallest level DWT lines. This will trigger
        // recursive reads of larger levels, all the way up to the actual
        // input file.
        for( line=0; line < level_y_size; line++ )
            dwt_level_line(dwt_levels, line);
        // deallocate all DWT level buffers that were used
        deallocate_all_dwt_level_buffers();
        // finished
        exit();
}
/*
**  Read one line for a level. Triggers recursive level DWT generation
*/
dwt_level_line(level, line)
{
    int    loop;
    // To generate a line of LL, LH, HL and HH at this level,
    // we read TWO lines of the next larger level LL value,
    // and generate two lines of lowpass and highpass from these,
    // into the middle of the FILTER_SIZE+1 lowpass and highpass
    // buffers. Source will be a larger level (if level > 0),
    // or will be the input source (if level == 0). So we stop
    // recursing if the current level is 0
    // Process two lines of input LL
    for( loop=0; loop < 2; loop++ ) {
        // read the LL input
        if( level == 0 )
            // At the largest level, read from input
            read_input_line(line * 2 + loop);
        else
            // At other levels, recurse to generate LL input
            dwt_level_line(level - 1, line * 2 + loop);
        // Throw out the oldest values in FILTER_SIZE+1 array
        roll_dwt_level_lohi_buffers(level);
        // Now compute the new lowpass highpass values for this line
        // once done, we can throw out the input LL values as they
        // are no longer needed. The lowpass and highpass filters
        // that will be generated from input are always the
        // center of the array. Note that we don't care what
        // line of input we are reading here — this is pure
        // relative to current line work.
        compute_lohi_from_ll(level);
    }
    // Now compute the LL, LH, HL and HH values relative
    // to the center of the FILTER_SIZE+1 lowpass and highpass
    // intermediate lines that are being held for the level.
    compute_lllhhlhh_from_lohi(level);
    // Now we can quantize and encode the LH, HL and HH values
    // for this line of this DWT level. If this level is the
    // smallest of all levels, we also quantize/encode the LL
    // level, otherwise we don't need to.
    quantize_encode_dwt_level_line(level);
    // At this point the LH, HL and HH values computed for this
    // line of this DWT level are no longer needed.
    // However, we do need to return the current LL line that
    // was generated for this level, to the calling smaller
    // DWT line generation.
    return( ll_line );
}
```

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A method for processing an image by a wavelet transform process using filters having a size F in a processor system having memory, comprising:

determining a number N of levels into which an image will be transformed, the levels ordered from a highest level to a lowest level;

allocating buffers for the N levels in the memory;

specifying an image to be acquired, the image having y lines of x pixels each;

acquiring the image; and the transform process recursively performing the following steps while the image is being acquired:

(a) requesting at least one line of the image for the highest level;

(b) producing transformation results at each level in response to provision of the at least one line to the highest level, the transformation results including, at each level, intermediate results and subband results resulting from the intermediate results;

(c) during production of transformation results, storing recently-produced intermediate results in the buffers, while discarding earlier-produced intermediate results from the buffers.

2. The method of claim 1, wherein the allocation of buffers includes determining an amount of memory for storing the intermediate results.

3. The method of claim 2, wherein the amount of memory for storing the intermediate results is given by:

$$M \geq (2*F*x*P)$$

in which M is the amount of memory, F is the filter size, x is the width of the image, and P is the symbol size of the pixels.

4. The method of claim 1, further including, during the transform process, at each level except the lowest level, retaining first subband results in the memory and transmitting second subband results.

5. The method of claim 4, further including transmitting all subband results of the lowest level.

6. The method of claim 4, further including discarding the first subband results at each level except the lowest level when intermediate results at the next lowest level are stored.

7. The method of claim 1, further including, during the transform process, at each level except the lowest level, retaining first subband results in the memory and storing second subband results in storage.

8. The method of claim 7, further including storing all subband results of the lowest level in storage.

9. The method of claim 7, further including discarding the first subband results at each level except the lowest level when intermediate results at the next lowest level are stored.

10. The method of claim 1, further including, during the transform process, at each level except the lowest level, retaining first subband results in the memory and compressing second subband results.

11. The method of claim 10, further including during the transform process, compressing the first and second subband results of the lowest level.

12. The method of claim 11, further including, during the transform process, transmitting compressed second subband results for all levels except the lowest level and transmitting compressed first and second subband results for the lowest level.

13. The method of claim 12, further including the step of locating the processor system in a satellite and placing the satellite in orbit.

14. The method of claim 11, further including, during the transform process, storing compressed second subband results for all levels except the lowest level and storing compressed first and second subband results for the lowest level.

15. The method of claim 14, further including the step of placing the processor system in a video transmission system.

16. The method of claim 1, wherein the intermediate results include lowpass and highpass results.

17. The method of claim 16, wherein the subband results include lowpass/lowpass, lowpass/highpass, highpass/lowpass, and highpass/highpass results.

18. The method of claim 1, wherein the subband results include lowpass/lowpass, lowpass/highpass, highpass/lowpass, and highpass/highpass results.

19. A method for acquiring and transmitting an image using a processor system having memory, comprising:
   determining a number N of levels into which an image will be transformed by a wavelet transform process using filters having a size F, the levels ordered from a highest level to a lowest level;
   allocating buffers for the N levels in the memory;
   specifying an image to be acquired, the image having y lines of x pixels each;
   acquiring the image;
   the transform process recursively performing the following steps while the image is being acquired:
      (a) requesting at least one line of the image for the highest level;
      (b) producing transformation results at each level in response to provision of the at least one line to the highest level, the transformation results including, at each level, intermediate results and subband results resulting from the intermediate results;
      (c) during production of transformation results, storing recently-produced intermediate results in the buffers, while discarding earlier-produced intermediate results from the buffer;
   during the transform process, at each level, compressing subband results to produced compressed subband results; and
   transmitting the compressed subband results.

20. The method of claim 19, wherein the allocation of buffers includes determining an amount of memory for storing the intermediate results.

21. The method of claim 20, wherein the amount of memory for storing the intermediate results is given by:

$$M \leq (2*F*x*P)$$

in which M is the amount of memory, F is the filter size, x is the width of the image, and P is the symbol size of the pixels.

22. The method of claim 19, wherein the intermediate results include lowpass and highpass results.

23. The method of claim 22, wherein the subband results include lowpass/lowpass, lowpass/highpass, highpass/lowpass, and highpass/highpass results.

24. The method of claim 19, wherein the subband results include lowpass/lowpass, lowpass/highpass, highpass/lowpass, and highpass/highpass results.

25. The method of claim 24, wherein the compressing step includes, at the lowest level, compressing all subband results, and at every other level, compressing lowpass/highpass, highpass/lowpass and highpass/highpass results.

26. A computer system for processing an image by a wavelet transform process using filters having a size F, comprising:
   a memory;
   computer code means for causing the computer system to:
   determine a number N of levels into which an image will be transformed, the levels ordered from a highest level to a lowest level;
   allocate buffers for the N levels in the memory;
   specify an image to be acquired, the image having y lines of x pixels each;
   acquire the image; and
   recursively perform the following transform processing steps while the image is being acquired:
      (a) requesting at least one line of the image for the highest level;

(b) producing transformation results at each level in response to provision of the at least one line to the highest level, the transformation results including, at each level, intermediate results and subband results resulting from the intermediate results;

(c) during production of transformation results, storing recently-produced intermediate results in the buffers, while discarding earlier-produced intermediate results from the buffers.

27. The computer system of claim 26, wherein the function of causing the computer system to allocate buffers includes causing the computer system to determine an amount of the memory for storing the intermediate results.

28. The computer system of claim 27, wherein the amount of the memory for storing the intermediate results is given by:

$$M \leq (2*F*x*P)$$

in which M is the amount of memory, F is the filter size, x is the width of the image, and P is the symbol size of the pixels.

29. The computer system of claim 26, further including means for transmitting, the code means for causing the computer system to retain first subband results in the memory for each level except the lowest level and provide second subband results for transmission.

30. The computer system of claim 29, wherein the code means is for causing the computer system to provide all subband results of the lowest level for transmission.

31. The computer system of claim 29, wherein the code means is for causing the computer system to discard the first subband results at each level except the lowest level when intermediate results at the next lowest level are stored.

32. The computer system of claim 26, further including storage means, the code means for, during the transform process, causing the computer system to retain first subband results in the memory and provide second subband results for storage, at each level except the lowest level.

33. The computer system of claim 32, the code means further for causing the computer system to provide all subband results at the lowest level for storage.

34. The computer system of claim 32, the code mean for causing the computer system to discard the first subband results at each level except the lowest level when intermediate results at the next lowest level are stored.

35. The computer system of claim 26, further including compression means, the code means for causing the computer system to retain first subband results in the memory and provide second subband results for compression during the transform process, at each level except the lowest level.

36. The computer system of claim 35, the code means for causing the computer system to provide first and second subband results of the lowest level for compression during the transform process.

37. The computer system of claim 36, the code means for causing the computer system to provide for transmission compressed second subband results for all levels except the lowest level and provide for transmission compressed first and second subband results for the lowest level.

38. The computer system of claim 26, wherein the intermediate results include lowpass and highpass results.

39. The computer system of claim 38, wherein the subband results include lowpass/lowpass, lowpass/highpass, highpass/lowpass, and highpass/highpass results.

40. The method of claim 26, wherein the subband results include lowpass/lowpass, lowpass/highpass, highpass/lowpass, and highpass/highpass results.

41. A satellite for acquiring and transmitting images, comprising:

an image source;

a transmitter;

a processor system having memory and being connected to the image source and the transmitter;

code means in the processor system for causing the processor system to:

determine a number N of levels into which an image will be transformed according to wavelet transform process using filters having a size F, the levels ordered from highest level to a lowest level;

allocate buffers for the N levels in the memory;

specify the image as having y lines of x pixels each;

receive the image line-by-line from the image source;

recursively perform the following steps during reception of the image:

(a) requesting at least one line of the image for the highest level;

(b) producing transformation results at each level in response to provision of the at least one line to the highest level, the transformation results including, at each level, intermediate results and subband results resulting from the intermediate results; and (c) during production of transformation results, storing recently-produced intermediate results in the buffers, while discarding earlier-produced intermediate results from the buffer; compress subband results to produce compressed subband results; and provide the compressed subband results to the transmitter.

42. The satellite of claim 41, wherein the code means is for causing the computer system to allocate buffers by determining an amount of memory for storing the intermediate results.

43. The satellite of claim 42, wherein the amount of memory for storing the intermediate results is given by:

$$M \leq (2*F*x*P)$$

in which M is the amount of memory, F is the filter size, x is the width of the image, and P is the symbol size of the pixels.

44. The satellite of claim 41, wherein the intermediate results include lowpass and highpass results.

45. The satellite of claim 44, wherein the subband results include lowpass/lowpass, lowpass/highpass, highpass/lowpass, and highpass/highpass results.

46. The satellite of claim 41, wherein the subband results include lowpass/lowpass, lowpass/highpass, highpass/lowpass, and highpass/highpass results.

47. The satellite of claim 46, wherein the code means is for causing the compressor to compress all subband results of the lowest level and to compress lowpass/highpass, highpass/lowpass and highpass/highpass results of every other level.

* * * * *